Sept. 18, 1923.
R. A. WEAGANT
METHOD AND APPARATUS FOR RADIOSIGNALING
Filed Feb. 7, 1919    4 Sheets-Sheet 1
1,468,061
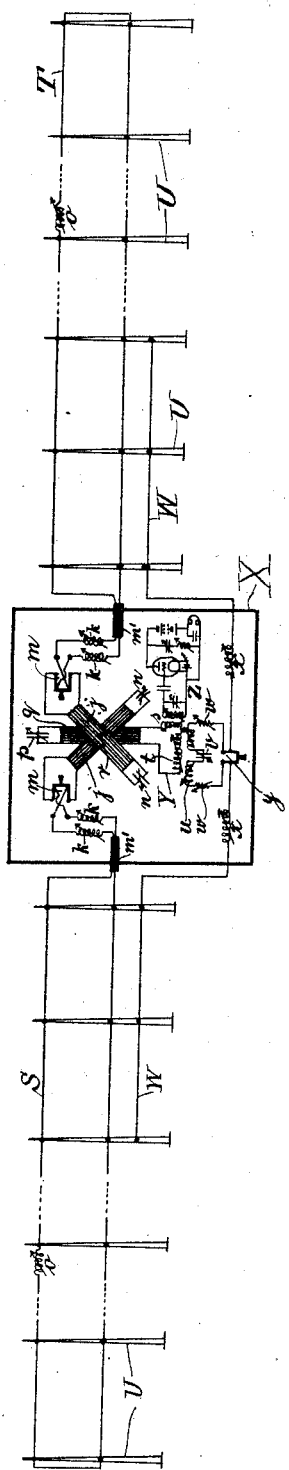
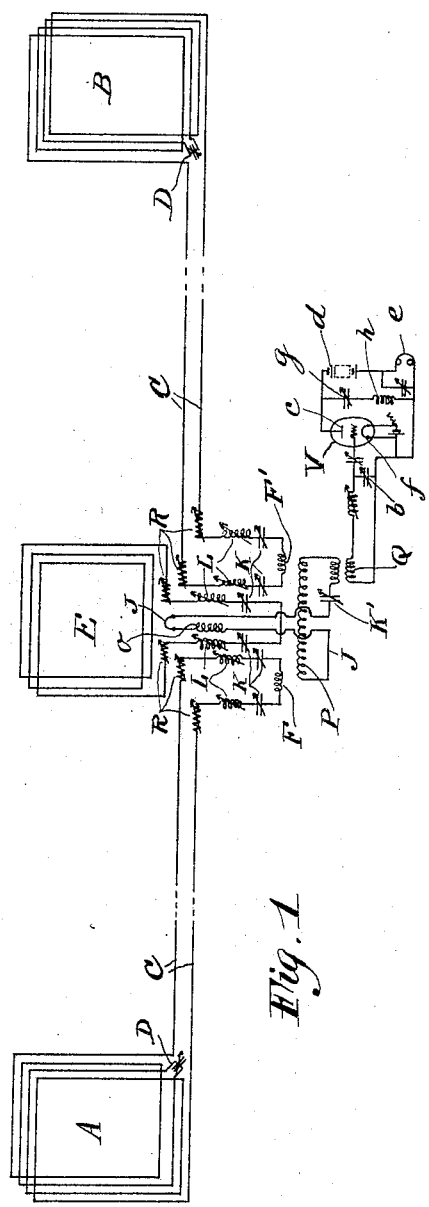
INVENTOR
Roy Alexander Weagant
BY
Herbert G. Ogden
his ATTORNEY Sept. 18, 1923.

R. A. WEAGANT 1,468,061

METHOD AND APPARATUS FOR RADIOSIGNALING

Filed Feb. 7, 1919     4 Sheets-Sheet 2

INVENTOR
Roy Alexander Weagant
BY
Herbert G. Ogden
his ATTORNEY

Sept. 18, 1923.

R. A. WEAGANT 1,468,061

METHOD AND APPARATUS FOR RADIOSIGNALING

Filed Feb. 7, 1919

INVENTOR
Roy Alexander Weagant
BY
Herbert G. Ogden
his ATTORNEY

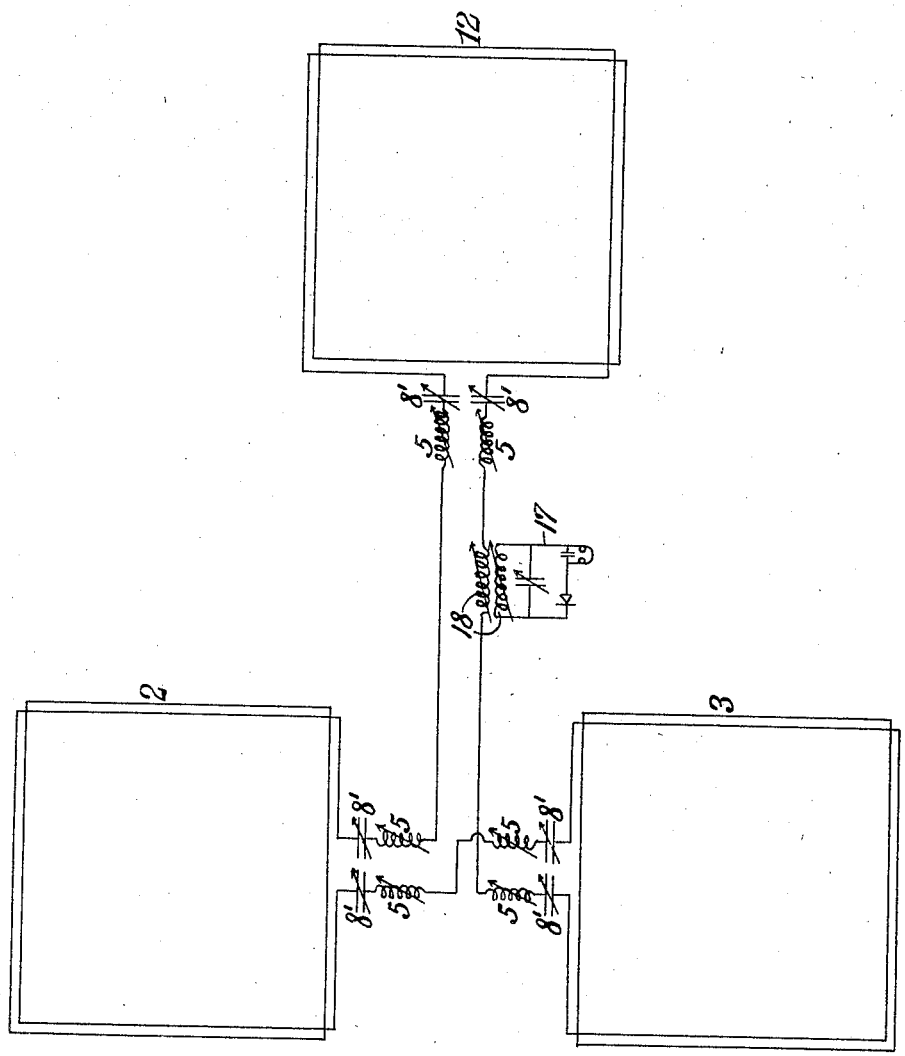

Patented Sept. 18, 1923.

1,468,061

UNITED STATES PATENT OFFICE.

ROY ALEXANDER WEAGANT, OF DOUGLAS MANOR, NEW YORK, ASSIGNOR, BY MESNE ASSIGNMENTS, TO RADIO CORPORATION OF AMERICA, A CORPORATION OF DELAWARE.

METHOD AND APPARATUS FOR RADIOSIGNALING.

Application filed February 7, 1919. Serial No. 275,553.

*To all whom it may concern:*

Be it known that I, ROY ALEXANDER WEAGANT, a citizen of the United States, and resident of Douglas Manor, county of Queens, city and State of New York, have invented certain new and useful Improvements in the Method and Apparatus for Radiosignaling, of which the following is a specification accompanied by drawings.

This invention relates to a method and apparatus for radio signaling, particularly with reference to minimizing the effects of static disturbances in radio reception.

This invention is based upon my discoveries in regard to the nature of static disturbances as set forth in my co-pending application Serial No. 181,458, in which I have disclosed new methods and apparatus for minimizing static effects by balancing out the static and retaining the signal currents.

In that application I utilized the principle of receiving signal impulses as horizontally propagated waves, and static impulses as vertically propagated waves to produce signal and static currents in a plurality of associated antennæ or portions of an antenna system. The present invention utilizes the same principle but the operation of receiving signals and eliminating static is carried out in a different way and with even more complete elimination of the static noises so far as tested up to the present time. To this end it also involves different apparatus, and includes an antenna system having a plurality of portions, separately adjustable, and means for suitably associating said portions whereby substantially static effects only may be received in one part of the system and these employed to neutralize the static in another part.

Receiving systems having a plurality of antenna portions of the same or different types and variously arranged and adjusted, may be devised for carrying out my method, and the method itself may be practised with different variations which will occur to those skilled in the art, without departing from my invention.

For the best results with my method, I prefer to receive both static and signal impulses in a plurality of differently positioned portions of an antenna system, and selectively combine the resulting currents to discriminate between static and signal effects in such manner that the signal goes out and the static currents are retained. I then balance these static currents against the static currents in another associated antenna portion, but utilize the signal in that associated portion. I have successfully operated this arrangement and method in a practical manner on a large scale under difficult conditions, over a considerable period of time, and it is very nearly 100% perfect in operation with ordinary varieties of static.

In order to distinguish the principle underlying the method disclosed in this application from the principles of some other methods of static elimination invented by me, I have applied the general term "static tank principle" to this method, because the antenna portion in which the signal is balanced out may be said to form a "static tank," from which static currents may be drawn in proper measure to neutralize the static in another antenna portion having both signal and static currents.

The accompanying drawings illustrate several forms of apparatus operating in accordance with the "static tank" principle, in which—

Figure 1 is a diagrammatic representation of an antenna system having portions in the form of loops connected by leads to receiving apparatus and effectively separated by an appreciable fraction of a wave length, and an additional loop portion associated therewith. This figure is substantially a duplicate of Figure 1 in my co-pending application Serial No. 244,564, but the invention claimed here is different from the invention claimed in that application, although based upon the same underlying principles discovered by me;

Figure 2 is a similar diagrammatic view of a modification of Figure 1 in which long low horizontally extending loops are provided having effective fractional wave length spacing, and an associated antenna in the form of a linear oscillator;

Figure 3:
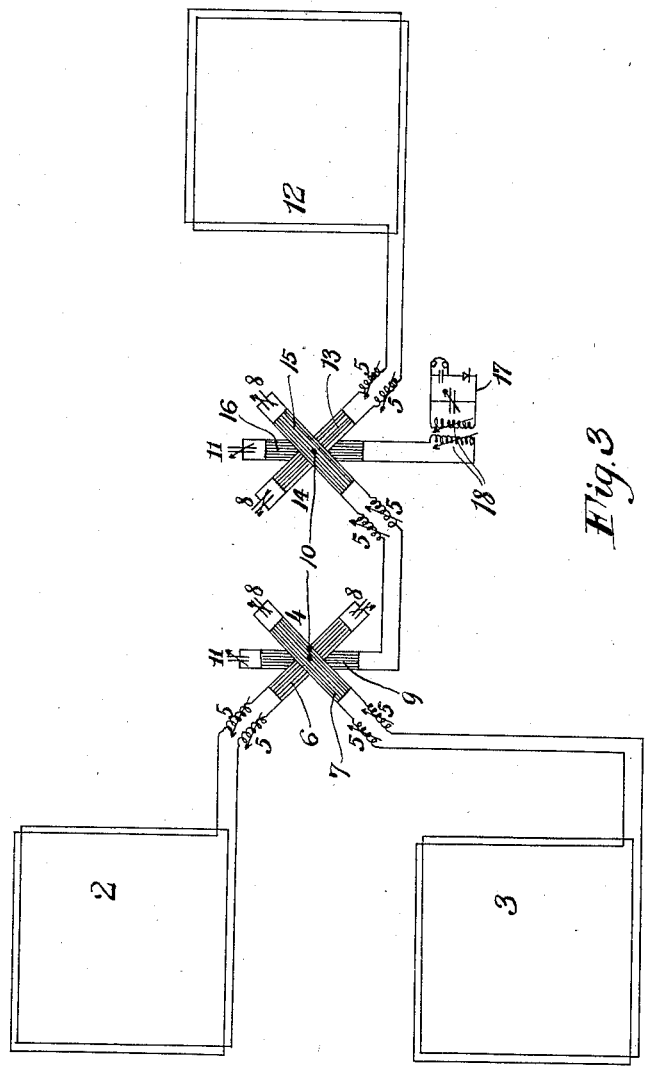
Figure 3 is another modification shown in diagrammatic form in which two superposed antennæ are provided in the form of loops, associated with an additional loop antenna, In this case fractional wave length spacing for signal waves is not utilized, and the three antennæ or portions of an antenna system are associated at the receiving station itself.

In the apparatus of Figure 3 I utilize an additional discovery I have made and disclosed in my co-pending application Serial No. 275,554, in regard to the nature of static disturbances, which I have discovered behave as if they had very short wave length, comparatively speaking; and Figures 4 and 5 are similar diagrammatic views of modifications.

Referring to the drawings, and at first more particularly to Figure 1, A and B are antennæ shown in this instance in the form of loops or cages separated by an appreciable fraction of a wave length in the direction of desired reception and connected by leads C to suitable receiving apparatus located substantially midway between the antennæ A and B. The leads are shown broken in their length to indicate that they are longer in proportion than actually shown, owing to the limitations of the sheet on which they are drawn. Tuning and controlling apparatus for the loops or cages A and B may be provided as illustrated in my Patent No. 1,356,751, of October 26, 1920, but I have shown variable condensers D preferably located in the circuits of the cages at the midpoints, or in series between the sets of loops forming the cages. The loop antennæ or cages may be of any suitable construction but I have indicated them diagrammatically for simplicity.

In the form of the invention shown in Figure 1 an additional cage or loop antenna E is preferably located in a convenient position relatively to the cages A and B with its plane extending in the same general direction as the planes of the cages A and B. For convenience, and in order to shorten the length of leads required, the cage E may be located as indicated in Figure 1 in the central region between cages A and B, near the receiving apparatus. The cages A, B and E are all shown ungrounded in this instance and by reason of their construction and arrangement are all similarly directional as to signals.

The receiving apparatus includes the circuits of both cages A and B forming portions of the antenna system and the circuit of cage E which forms another portion thereof. The leads C from cages A and B as shown are connected to the coupling coils F and F' respectively. At the receiving station and forming part of the receiving apparatus, are shown variable resistances R, inductances L, and condensers K, connected in the circuit of leads C for tuning and adjusting purposes, and the number and arrangement of these adjustable means may be varied as desired. Variable resistances R, inductance coils L, and condensers K are shown connected in the circuit of the cage B for adjusting and tuning purposes, and these may be varied as desired.

Suitable receiver circuits, including detecting means, preferably in the form of a three-element vacuum valve V, are adapted to be coupled to the antenna system portions A, B, and E. Any suitable means may be provided for so coupling the receiver circuits and in this instance I have shown an intermediate circuit J coupled to one of the coils L in the circuit of the antenna E by means of the coil C, and also coupled to the coils F and F' in the antennæ A and B by means of the coil P. A variable condenser K' may be provided in the intermediate circuit J and the receiver circuits including the vacuum valve V are suitably coupled to the intermediate circuit at Q. The vacuum valve V is connected to the oscillatory circuit containing the condenser $b$ and the valve has, as shown, the usual plate circuit $c$, $d$, $e$, $f$, and in addition the oscillatory circuit $c$, $g$, $h$, $f$, although any suitable or desired circuits may be used.

While I have shown the connections as illustrated diagrammatically in Figure 1 for the antennæ A and B, it is to be understood that the cages A and B may be connected up in any one of the arrangements I have shown in my co-pending applications Serial Numbers 157,594, 181,458, 275,554 and Patent No. 1,356,751, relating to the elimination of static, and the third loop E may be coupled in any suitable manner to the circuits of the antennæ A and B, and tuned in the usual manner. I prefer to tune all three loops or cages A, B and E to the same frequency.

Although there are several modes of operating the system shown in Figure 1 as set forth in my co-pending application Serial No. 244,564, the preferred method of operation, in accordance with the static tank principle, is to adjust the receiving circuits and apparatus so that the signal instead of the static is balanced out of the antennæ A and B, and the static currents in said system A B are then opposed to the static currents from antenna E, in order to neutralize said currents, thus retaining the signal from antenna E. If the spacing between antennæ A and B is not half wave length, then, when antennæ A and B are coupled together so as to add the static, some of the signal from said antennæ will be left, and this will be the greater the more the spacing between said antennæ differs from half wave length. At the time of filing my co-pending application Serial No. 244,564, that is July 12, 1918, and as stated therein, I had not had opportunity to operate the apparatus of Figure 1 with the maximum spacing obtainable, owing to certain physical limitations under which I was working.

I have however operated the system illustrated in Figure 2 with effective spacing of substantially half wave length, and I will now describe the system of Figure 2:

In Figure 2 one antenna system, in which the signal is preferably balanced out and the static retained, is constructed with long low loops, substantially like those shown in the Patent 1,356,562 to myself and Frank N. Waterman. In this instance the loops S and T were suitably supported and insulated on thirty foot poles U as a convenient height. The loops were constructed of No. 14 B. & S. copper wire and each loop was substantially three miles long, extending horizontally in the general direction of reception. The distance between the upper and lower lengths of the loops was approximately fifteen feet and the lower length was about fifteen feet above the ground, so that convenient passage could be had under the loops without interference with the system. The loops are shown broken away at the dotted lines to indicate that they are longer in proportion than actually drawn, and they may of course be constructed of any convenient or desired length. The loops S and T were constructed to extend in a general northeasterly and southwesterly direction for the purpose of radio reception, particularly from the high power stations at Nauen, Germany; Carnarvon, Wales; Lyons and Eiffel Tower, France; and Rome, Italy; although reception was not limited to these stations only. The wave lengths respectively of these stations, in meters, were: Nauen 12,000; Carnarvon 13,500; Lyons 15,000 and 8,000; Eiffel Tower 8,000; and Rome 11,000.

The additional aerial I used for receiving both static and signal, consisted of an antenna in the form of a linear oscillator W also composed in this instance of No. 14 B. & S. copper wire and conveniently strung along the poles U on insulators underneath the loops S and T as indicated in the drawing Figure 2. This wire W need only be of a length capable of picking up sufficient signal for purposes of reception and detection, and I have obtained excellent and satisfactory results with a wire extending about 3,000 feet each side of the receiving house indicated diagrammatically at X, so that this third antenna system, or additional portion of the whole antenna system, was approximately 6,000 feet long, as compared to a total length of six miles for the loop system. The open wire antenna W need not necessarily be on the same poles with the loops, but could if desired be arranged at one side of the loop system, substantially parallel thereto, and all portions of the system, both loops and linear oscillator, are preferably ungrounded although one or more of them may be counterpoised if desired, depending upon actual working conditions. As in Figure 1 all portions of the antenna system shown in Figure 2 are similarly directional as to signals.

Suitable means are provided for associating the differently circumstanced or positioned portions of the antenna system in such manner that a common receiving circuit Y may be simultaneously affected by the residual static currents from the loop system S T and by the static and signal currents from the linear oscillator system W, and the residual currents in the loop system are selectively utilized to oppose the static currents in the linear oscillator, while retaining the signal currents therein. The signal currents are detected by any suitable detector circuit Z, similar to the detector circuit shown in Figure 1 and coupled to the common receiving circuit Y.

In this instance, a radiogoniometer is shown operatively connected in the system, because such an instrument is delicately adjustable and suitable for my purposes. The loops S and T are connected respectively to the fixed coils $j$ of the goniometer through variable tuning inductances $k$ and preferably through reversing switches $m$ for reversing the connections of the loops to the goniometer coils, which has been found beneficial as heretofore described in Patents 1,356,751 and 1,356,752 above referred to. The leads from the loops are preferably brought into the receiving house through short lengths of lead covered cable $m'$ as shown, which are approximately twelve feet long and hence trivial in length compared to the length of the loops. Variable tuning condensers $n$ are preferably connected in series with the fixed goniometer coils $j$, and I have found that it is desirable to connect variable line inductances $o$ preferably substantially at the middle points in the upper lengths of the loops S and T. With loops of the length described I have used line inductances $o$ of a value of five milli-henrys each, with satisfactory results.

A variable condenser $p$ is shown connected in series with the movable coil $q$ of the goniometer, which coil is pivoted in the usual manner about the axis $r$. The circuit Y including the movable coil $q$, is coupled to the detector circuit Z by means of the coupling coils $s$ and the circuit Y is as shown provided with another coupling coil $t$ to which the linear oscillator W is coupled by means of the coil $u$. A variable condenser $v$ is preferably inserted substantially at the midpoint in series in the coil $u$ and variable resistances $w$ are also preferably provided in series with the coil $u$ for adjusting purposes. The linear oscillator W has included in its circuit variable tuning inductances $x$ and a switch $y$ is provided for opening and closing the circuit of the antenna portion W as desired, because the system shown in Figure 2 may be used with either the loops S and T alone or with all three antennæ S, T, and W.

In the modification of the invention shown in Figure 3 two loop antennæ 2 and 3 are shown one above the other in substantially the same vertical plane although they could be superposed in substantially parallel vertical planes and it is not necessary that the loops be strictly vertical. The loops 2 and 3 should be substantially in line with the transmitting station from which signals are to be received and as shown they are both substantially the same distance from such a transmitting station. The loops are connected to a goniometer 4 in the usual manner, that is loop 2 is connected through the variable tuning inductances 5 to one fixed coil 6 of the goniometer and loop 3 is connected through similar variable tuning inductances 5 to the other fixed coil 7 of the goniometer. Variable condensers 8 are preferably connected as usual in series with the fixed goniometer coils 6 and 7 and the movable coil 9 is pivoted about the axis 10 and is provided with the variable condenser 11.

With the construction so far described, signal currents in the superposed coils 2 and 3 will be in phase and they balance out while the currents due to static disturbances will be out of phase by an amount depending upon the vertical separation between the loops. I have found that the vertical separation of approximately twenty-five feet between centers of loops such as 2 and 3 is sufficient for my purposes to produce difference of phase between the static currents in the loops. The loops need not be of any great size and I have obtained good results with loops about four feet in diameter, with as many turns as may be necessary.

In order to complete the system shown in Figure 3 so that it will operate upon the static tank principle I provide a third loop 12 near the other loops 2 and 3 but far enough from them to prevent material coupling. Loop 12 is connected through the variable tuning inductances 5 to one fixed coil 13 of a second goniometer 14. The movable coil 9 of the first goniometer 4 is shown connected through the variable tuning inductances 5 to the other fixed coil 15 of goniometer 14. The circuit of the movable coil 16 of goniometer 14 is coupled to a suitable detector circuit 17 by means of the coupling coils 18.

In the operation of the system shown in Figure 3 all the loops 2, 3, and 12 are tuned to the frequency of the incoming signal. Owing to the relative difference of phase between the signal and static currents in the superposed loops 2 and 3 the signal may be balanced out and the static retained in that portion of the antenna system, thus forming a static tank. The static currents in the antenna system 2, 3 are then balanced against the static currents in the system 12, retaining and utilizing the signal in the loop 12.

In the modification shown in Figure 4, two long low loops 19 and 20 supported on post or poles 21, and having an effective separation of an appreciable fraction of a wave length, are connected respectively to the fixed coils 22 and 23 of a goniometer 24, having the usual variable condensers connected in circuit with its coils. Variable tuning inductances 25 are provided for tuning the loops to the incoming signal, it being understood that the circuits and connections of Figure 4 are merely diagrammatic and such other desired adjusting and tuning devices may be included as indicated in my co-pending application Serial No. 244,563 hereinbefore referred to.

Another antenna system portion in the form of superposed loops 26 and 27 conveniently supported on poles 28 is associated with the loop system 19 and 20. The loops 26 and 27 may be of any desired or convenient length and I have indicated them as much shorter in comparison with the loops 19 and 20. The loops 26 and 27 are assumed to be arranged in a substantially vertical plane at one side of a parallel to the loops 19 and 20. Loop 26 is connected through variable tuning inductances 25 to the fixed coil 29 of the goniometer 30 and loop 27 is connected through variable inductances 25 to the fixed coil 31 of said goniometer.

The movable coil 32 of goniometer 24 and the movable coil 33 of goniometer 30 are connected respectively through variable inductances 25 to the fixed coils 34 and 35 of the third goniometer 36, the circuit of the movable coil 37 of which is coupled to a detector circuit 38 by means of the coupling coils 39.

In the operation of the modification shown in Figure 4 let it be assumed that the signal waves reaching the loops 26 and 27 simultaneously produce in phase currents which are balanced out by means of goniometer 30 and the out of phase static currents are retained. The antenna system represented by the loops 19 and 20 is adjusted through the agency of the goniometer 24 to balance out the static and retain the signals. The residue of static which may be left at the balance point is balanced against the static in the system represented by the loops 26 and 27 through the agency of the goniometer 36 and the remaining signal currents are detected in the detector circuit 38.

While I have shown the several portions of the whole antenna system in each of Figures 1 to 4 inclusive as in effect separate antennæ associated by coupling coils, I do not intend to exclude arrangements wherein the several portions or some of them are directly connected together to directly cancel out signal or static, or both, nor do I intend to exclude arrangements whereby one portion or portions while acting as such, also act as part of another portion.

As a single instance, by way of illustration, I have shown in Figure 5 an arrangement wherein the superposed loop portions 2 and 3 of Figure 3 are directly connected together to oppose simultaneously received waves due to signals, and the other loop antenna portion 12 is directly connected to the circuit of the loops 2 and 3 as shown. The detector circuit 17 is coupled to the antenna system by means of the coupling coils 18, and in addition to the variable tuning inductances 5, variable condensers 8′ are provided for tuning the different portions of the antenna system.

In the actual operation of my present invention, I have found that I am able thereby to eliminate forms of static or atmospheric disturbances which are not sufficiently eliminated when using the inventions disclosed in my said prior applications, Nos. 157,594, 181,458, 206,723, and Patent 1,356,751. I find also that the apparatus of the present invention possesses marked directive properties whereby I am able to eliminate interference from undesired signal waves.

I wish it understood that in the appended claims where I use the word "collect" or "collecting" in connection with the action of signals or static on an antenna portion, I mean that the signal or static, as the case may be, sets up currents in the antenna portion or portions in question. Where, on the other hand, I use the word "receive" or "receiving," I use these words broadly to mean that the static or signal waves strike the antenna portion or portions referred to.

I claim and desire to obtain by Letters Patent, the following:

1. The method of minimizing static interference in radio reception, which consists in tuning a receiving system to the signal frequency and collecting signal and static effects in a portion thereof substantially eliminating signal effects from a portion, receiving signal effects and some static effects in a second portion of said system, utilizing the static effects in said first portion to neutralize like effects in said second portion, and utilizing the signal effects in said last named portion.

2. The method of minimizing static interference in radio reception which consists in collecting in one portion of an antenna system signal effects and static effects as impulses of a pre-determined frequency, neutralizing the signal effects of said portion, collecting in another portion of said system both static effects and signal effects as impulses of the same frequency, and neutralizing in the last-named portion of the system static effects by combining them with the static effects produced in the first-named portion.

3. The method of minimizing static interference in radio reception which consists in tuning one portion of an antenna system to substantially the frequency of incoming signals, and collecting in that portion signal effects and static effects, eliminating the signal effects of said portion, collecting in another portion of said system both static effects and signal effects, and neutralizing in the last-named portion of the system static effects by combining them with the static effects produced in the first-named portion.

4. The method of minimizing static interference in radio reception, which consists in opposing the signal effects in differently circumstanced portions of a receiving system, opposing the static effects of said portions to those of another portion of said system, and utilizing the signal effects of said last-named portion.

5. The method of minimizing static interference in radio reception, which consists in balancing out the opposed components of the signal currents in a plurality of differently positioned antennæ, balancing the remaining static currents against those in another antenna, and utilizing the signal current therein.

6. The method of minimizing static interference in radio reception, which consists in receiving static and signal impulses in a plurality of differently positioned antenna portions, selectively combining the resulting currents to discriminate between static and signal effects, and affecting a receiving device simultaneously by the residual currents and those of another antenna portion, so as to minimize the static effects and retain a predominant signal current.

7. The method of minimizing static interference in radio reception, which consists in selectively utilizing the residual currents in opposed differently circumstanced antenna system portions to oppose static currents in another portion, and retain the signal currents therein.

8. The method of minimizing static interference in raido reception, which consists in affecting a receiving circuit by the residual currents in opposed differently positioned antenna system portions, and affecting said receiving circuit by the static and signal currents in a third portion to minimize the effect of static while retaining the signal.

9. The method of minimizing static interference in radio reception, which consists in receiving static and signal impulses in a plurality of antenna system portions effectively separated by an appreciable fraction of a wave length in the direction of transmission, opposing the signal and retaining the static currents therein, receiving static and signal impulses in another portion, opposing the said retained static currents to those of said last named portion, and retaining the signal current therein.

10. The method of minimizing static interference in radio reception, which consists in receiving static and signal impulses in a plurality of loop antennæ effectively separated by an appreciable fraction of a wave length in the direction of transmission, opposing the signal and retaining the static currents therein, receiving static and signal impulses in another antenna, opposing the said retained static currents to those of said last named antenna, and retaining the signal current therein.

11. The method of minimizing static interference in radio reception, which consists in receiving static and signal impulses in a plurality of loop antennæ effectively separated by an appreciable fraction of a wave length in the direction of transmission, opposing the signal and retaining the static currents therein, receiving static and signal impulses in another antenna in the form of a linear oscillator, opposing the said retained static currents to those of said last named antenna, and retaining the signal current therein.

12. The method of minimizing static interference in radio reception, which consists in selectively utilizing the residual currents in opposed differently circumstanced loop antennæ to oppose static currents in another antenna in the form of a linear oscillator and retain the signal currents therein.

13. The method of minimizing static interference in radio reception, which consist in affecting a receiving circuit by the residual currents in opposed differently positioned antenna system portions tuned to the same frequency, and affecting said receiving circuit by the static and signal currents in a third portion to minimize the effect of static while retaining the signal.

14. The method of minimizing static interference in radio reception, which consists in selectively utilizing the residual currents in opposed differently circumstanced antenna system portions directional as to signals to oppose static currents in another portion similarly directional as to signals, and retain the signal currents therein.

15. The method of minimizing static interference in radio reception, which consists in affecting a receiving circuit by the residual currents in opposed differently positioned ungrounded antenna system portions, and affecting said receiving circuit by the static and signal currents in a third ungrounded portion to minimize the effect of static while retaining the signal.

16. At a radio transmission receiving station, a pair of antenna systems one of said systems comprising a plurality of differently positioned antenna portions, means for selectively combining the resulting currents in said antenna portions to discriminate between static and signal effects, a receiving device, an additional antenna portion forming the other system, and means for simultaneously affecting said receiving device by the residual currents from the first system and those of the other system, so as to minimize the static effects and retain a predominant signal current.

17. At a radio transmission receiving station, a pair of antenna systems one of said systems having opposed differently circumstanced portions and an additional antenna portion associated therewith forming the other system, and means for selectively utilizing the residual currents in said opposed portions, to oppose static currents in said additional portion, while retaining the signal currents therein.

18. At a radio transmission receiving station, a pair of antenna systems one of said systems having opposed differently positioned portions, and an additional antenna portion associated therewith forming the other system, a common receiving circuit, and means for affecting said receiving circuit by the residual currents in said opposed portions and by the static and signal currents in said additional portion while retaining the signal.

19. At a radio transmission receiving station, a plurality of antenna system portions effectively separated by an appreciable fraction of a wave length in the direction of transmission, another portion associated therewith, and means for opposing the signal and retaining the static currents in said plurality of separated portions, including means for opposing the said retained static currents to those in said other portion, while retaining the signal current therein.

20. At a radio transmission receiving station, a plurality of loop antennæ effectively separated by an appreciable fraction of a wave length in the direction of transmission, another antennæ system associated therewith, and means for opposing the signal and retaining the static currents in said plurality of separated antennæ, including means for opposing the said retained static currents to those in said other antenna, while retaining the signal current therein.

21. At a radio transmission receiving station, a plurality of loop antennæ effectively separated by an appreciable fraction of a wave length in the direction of transmission, another antenna in the form of a linear oscillator associated therewith and means for opposing the signal and retaining the static currents in said plurality of separated antennæ, including means for opposing the said retained currents to those in said other antenna while retaining the signal current therein.

22. At a radio transmission receiving station, a pair of antenna systems, one of said systems comprising a plurality of loop antennæ and another antenna in the form of a linear oscillator associated therewith forming the other system, a common receiving circuit, and means for selectively combining the static and signal currents in said antennæ to exclude static and retain signal currents in said receiving circuit.

23. At a radio transmission receiving station, a pair of antenna systems, one of said systems comprising a receiving system having antenna portions in the form of loops and an associated portion in the form of a linear oscillator forming the other system, means for selectively combining the static and signal currents in the said loop portions including means for selectively combining the residual current in said loop portions with the currents in said linear oscillator, and means for detecting the remaining signal currents.

24. At a radio transmission receiving station, a pair of antenna systems, one of said systems comprising opposed differently circumstanced loop portions, an additional portion in the form of a linear oscillator associated therewith forming the other system, and means for selectively utilizing the residual currents in said opposed loop portions to oppose static currents in said linear oscillator, while retaining the signal currents therein, and means for detecting said retained signal currents.

25. At a radio transmission receiving station, a pair of antenna systems, one of said systems comprising opposed differently positioned antenna portions tuned to the same frequency and an additional antenna portion associated therewith forming the other system, a common receiving circuit, and means for affecting said receiving circuit by the residual currents in said opposed antenna portions and by the static and signal currents in said additional portion, to minimize the effect of static while retaining the signal, and means for detecting the retained signal currents.

26. At a radio transmission receiving station, a pair of antenna systems, one of said systems comprising opposed differently circumstanced antenna portions directional as to signals, and additional portion also directional as to signals associated therewith forming the other system, and means for selectively utilizing the residual currents in said opposed antenna portions to oppose static currents in said additional portion while retaining the signal currents.

27. At a radio transmission receiving station, a pair of antenna systems comprising opposed differently positioned antenna portions and an additional portion associated therewith forming the other system, all of said portions being similarly directional as to signals, a common receiving circuit, and means for affecting said receiving circuit by the residual currents in said opposed portions and by the static and signal currents in said additional portion while retaining the signal.

28. At a radio transmission receiving station, a pair of antenna systems, one of said systems comprising opposed differently positioned antenna portions and an additional portion associated therewith forming the other system, all of said portions being insulated from the earth throughout, a common receiving circuit, and means for affecting said receiving circuit by the residual currents in said opposed portions and by the static and signal currents in said additional portion while retaining the signal.

29. At a radio transmission receiving station, an antenna system, means for substantially eliminating signal effects from a portion of said system which is tuned to the signal waves while retaining static effects, means for receiving both static and signal in another portion of said system, means for utilizing the static effects in said first portion to neutralize like effects in said second portion, and means for utilizing the signal effect in said last named portion.

30. The method of minimizing static interference in radio reception which consists in collecting in one portion of an antenna system and associated circuits signal and static effects, neutralizing the signal effects of said portion, collecting in another portion of said system both static effects and signal effects, said effects being all of signal frequency, and neutralizing in the last-named portion of the system static effects by combining them with the static effects produced in the first-named portion.

31. The method of minimizing static interferance in radio reception which consists in tuning two portions of an antenna system to the same frequency, collecting in one portion of said system signal and static effects, neutralizing the signal effects of said portion, collecting in another portion of said system both static effects and signal effects, and neutralizing in the last-named portion of the system static effects by combining them with the static effects produced in the first-named portion.

32. In radio reception, apparatus for minimizing the interference of static impulses, comprising a plurality of associated portions of an antenna system, each being adapted to collect both static and signal waves, neutralizing the signal effects of certain of said portions, all of said portions being tuned to the signal waves, and means for selectively combining the currents due to static and signal waves in said antenna portions in such manner that static currents are cancelled and the signal currents retained.

33. In radio reception, apparatus for minimizing the interference of static impulses, comprising a plurality of associated portions of an antenna system, each being adapted to collect both static and signal waves, neutralizing the signal effects of certain of said portions, all of said portions being tuned to the signal waves, and means for opposing and cancelling the static currents in said antenna portions while retaining the signal currents.

34. In radio reception, apparatus for minimizing the interference of static impulses, comprising a plurality of associated portions of an antenna system tuned to the same wave lengths, each being responsive to both static and signal waves, means for neutralizing signal effects in certain of said portions, and means for differentially combining the static currents of said antenna portions, while retaining the signal currents.

35. The method of minimizing interference which consists in receiving desired and interfering waves in differently circumstanced portions of an antenna system, opposing the effects of desired waves received by certain portions and utilizing the remaining effects of said portions, including those of undesired waves, to neutralize the corresponding effects in another portion of said system and utilizing the remaining signal effects.

36. In a radio receiving system, a pair of antenna systems, one of said systems comprising a plurality of differently circumstanced antenna system portions, means for opposing effects of desired signals due to said portions, another antenna portion forming the other system, means for utilizing effects of undesired waves in said portions forming the first system to neutralize corresponding effects due to the portion forming the other system, and means for utilizing the signal effects in said last-named portion.

37. In a radio receiving system, a pair of antenna systems, one of said systems comprising a collector system having a plurality of individually influenced portions, a circuit associated with said portions, means for neutralizing in said circuit the effects of desired signals in said portions while retaining undesired effects, a second collector system, means associating said circuit and the second collector system, said means including means whereby said undesired effects may be brought into opposition.

38. The method of minimizing static interference in radio reception which consists in tuning a plurality of antenna system portions to the same frequency, collecting signal and some static effects in different portions of the system, eliminating signal from one of the portions of the system and using the remaining static in said last-named portion to neutralize the effect of static in the remaining portion of the antenna system.

39. The method of minimizing static interference in radio transmission which consists in collecting signal and static in one portion of an antenna system as oscillations of a given frequency, neutralizing the signals in said portion, collecting both static and signals in another portion of said antenna system both as oscillations of said frequency, and opposing the currents due to static in said antenna portions while retaining the signals.

40. The method of minimizing static interference in radio transmission which consists in collecting in an antenna signal currents and static currents of said signal frequency, neutralizing signal currents in one portion of an antenna system, collecting both static and signals in another portion of said antenna system and opposing the currents due to static in said antenna portions while retaining the signals.

In testimony whereof I have signed this specification in the presence of two subscribing witnesses.

ROY ALEXANDER WEAGANT.

Witnesses:
  M. H. PAYNE,
  HERBERT G. OGDEN.